United States Patent
Seita (10) Patent No.: US 8,628,259 B2
(45) Date of Patent: Jan. 14, 2014

(54) IMAGE PICKUP APPARATUS HAVING MECHANISM TO SUPPRESS MIRROR BOUNCE

(75) Inventor: Masato Seita, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 13/327,116

(22) Filed: Dec. 15, 2011

(65) Prior Publication Data

US 2012/0163793 A1 Jun. 28, 2012

(30) Foreign Application Priority Data

Dec. 22, 2010 (JP) ................................. 2010-285876

(51) Int. Cl.
- *G03B 17/00* (2006.01)
- *G03B 15/00* (2006.01)
- *G03B 19/12* (2006.01)

(52) U.S. Cl.
USPC ............................ 396/447; 396/352; 396/358

(58) Field of Classification Search
USPC ................... 396/447, 352, 353, 354
See application file for complete search history.

(56) References Cited

U.S. PATENT DOCUMENTS

| 5,768,644 A | 6/1998 | Tanabe |
|---|---|---|
| 2010/0027091 A1 | 2/2010 | Hwang et al. |

FOREIGN PATENT DOCUMENTS

| JP | 09-203972 | 8/1997 |
|---|---|---|
| JP | 09-274249 A | 10/1997 |
| JP | 2008-287110 | 11/2008 |
| JP | 2010-002868 A | 1/2010 |

OTHER PUBLICATIONS

European Search Report issued on Apr. 4, 2012, that issued in the corresponding European Patent Application No. 11194846.9.

*Primary Examiner* — Rochelle-Ann J Blackman (74) *Attorney, Agent, or Firm* — Cowan, Liebowitz & Latman, P.C.

(57) ABSTRACT

An image pickup apparatus capable of reducing variations in the time it takes for mirror bounce to end caused by adjustments made to the angle of a mirror, making assembly of the image pickup apparatus more efficient, and making the image pickup apparatus more compact. A mirror unit comes into contact with a positioning pin so as to be positioned in the shooting optical path. Rotating an adjustment member, on which a lock lever is rotatably fitted and to which the positioning pin is fixed, causes the mirror unit to move following the adjustment member. The lock lever and the positioning pin eccentrically move according to the rotation of the adjustment member and move in the same direction by the same amount. A gap between the mirror unit and a lock pin of the lock lever is constant.

4 Claims, 7 Drawing Sheets

IMAGE PICKUP APPARATUS HAVING MECHANISM TO SUPPRESS MIRROR BOUNCE

BACKGROUND OF THE INVENTION

1. Field of the Invention

The present invention relates to an image pickup apparatus such as a single-lens reflex camera, and particularly to an image pickup apparatus having a mechanism to suppress mirror bounce.

2. Description of the Related Art

In some image pickup apparatuses such as single-lens reflex cameras, a mirror enters a shooting optical path at the time of observation through a viewfinder and guides subject light to a finder optical system and a focus detection unit, and the mirror retracts from the shooting optical path at the time of shooting and guides subject light to a silver salt film or an image pickup device.

In such image pickup apparatuses, when the mirror enters the shooting optical path, the mirror is positioned at a predetermined position by coming into contact with a stopper provided in a mirror box, but bounce of the mirror occurring due to a collision with the stopper is preferably suppressed. This is because by suppressing bounce of the mirror, a finder image can be stabilized, and also, focus detection can be started at an early stage.

The position at which the mirror is stopped in the shooting optical path by the stopper is preferably adjustable because the image pickup apparatuses have manufacturing errors. It is thus preferable to provide the image pickup apparatuses with a mechanism to suppress bounce of the mirror and a mechanism to adjust the position of the stopper with which the mirror comes into contact, in other words, the angle of the mirror.

Accordingly, there has been proposed an image pickup apparatus having an eccentric pin for adjusting the angle of a mirror and a bounce suppressing member (Japanese Laid-Open Patent Publication (Kokai) No. H09-203972). Also, there has been proposed an image pickup apparatus in which a mirror angle positioning stopper and a bounce suppressing member rotate integrally with each other to adjust the angle of a mirror (Japanese Laid-Open Patent Publication (Kokai) No. 2008-287110).

According to Japanese Laid-Open Patent Publication (Kokai) No. H09-203972, an angle adjustment unit for a sub mirror and a position adjustment unit for the bounce suppressing member are separately provided, and hence when the angle of the sub mirror is adjusted, the positional relationship between the bounce suppressing member and the sub mirror changes. When this positional relationship changes, however, the time it takes for bounce of the mirror to end changes, and hence every time the angle of the sub mirror is adjusted, it is necessary to adjust the position of the bounce suppressing member as well, and as a result, assembling the image pickup apparatus requires time and effort.

On the other hand, according to Japanese Laid-Open Patent Publication (Kokai) No. 2008-287110, when the position of the stopper with which a sub mirror comes into contact with is adjusted, the positional relationship between the sub mirror and the bounce suppressing member is unchanged. However, a holding member that adjusts the position is provided with the stopper and the bounce suppressing member, and hence a relatively large installation space is required, which stands in the way of making the image pickup apparatus more compact.

SUMMARY OF THE INVENTION

The present invention provides an image pickup apparatus capable of reducing variations in the time it takes for bounce of a mirror to end that are caused by adjustments made to the angle of the mirror, thus making assembly of the image pickup apparatus more efficient and making the image pickup apparatus more compact.

Accordingly, a first aspect of the present invention provides a image pickup apparatus comprising a mirror unit configured to enter a shooting optical path at a time of observation through a viewfinder, and retract from the shooting optical path at a time of shooting, a positioning member with which the mirror unit having entered the shooting optical path comes into contact so as to be positioned in the shooting optical path, a bounce suppressing member comprising a lock pin configured to suppresses bounce of the mirror unit that has come into contact with the positioning member, and an adjustment member comprising a shaft portion on which the bounce suppressing member is rotatably fitted and to which the positioning member is fixed, the shaft portion being eccentric from a rotational center of the adjustment member, wherein the mirror unit moves following the movement of the positioning member, wherein the bounce suppressing member that is fitted on the shaft portion and the positioning member that is fixed to the shaft portion eccentrically move according to the rotation of the adjustment member and move in the same direction at the same travel distance, and wherein a gap between the mirror unit and the lock pin in the bounce suppressing member before and after the movement of the mirror unit is constant.

According to the present invention, variations in the time it takes for bounce of the mirror to end caused by adjustments made to the angle of the mirror can be reduced, assembly of the image pickup apparatus can be made more efficient, and the image pickup apparatus can be made more compact.

Further features of the present invention will become apparent from the following description of exemplary embodiments (with reference to the attached drawings).

BRIEF DESCRIPTION OF THE DRAWINGS

FIG. 6 is a view showing in detail the relationship between gaps between a lock pin and a hook portion before and after angle adjustment of the sub mirror, in which FIG. 5A and FIG. 5B are superimposed.

DESCRIPTION OF THE EMBODIMENTS

The present invention will now be described in detail with reference to the drawings showing a preferred embodiment thereof.

Figure 1:
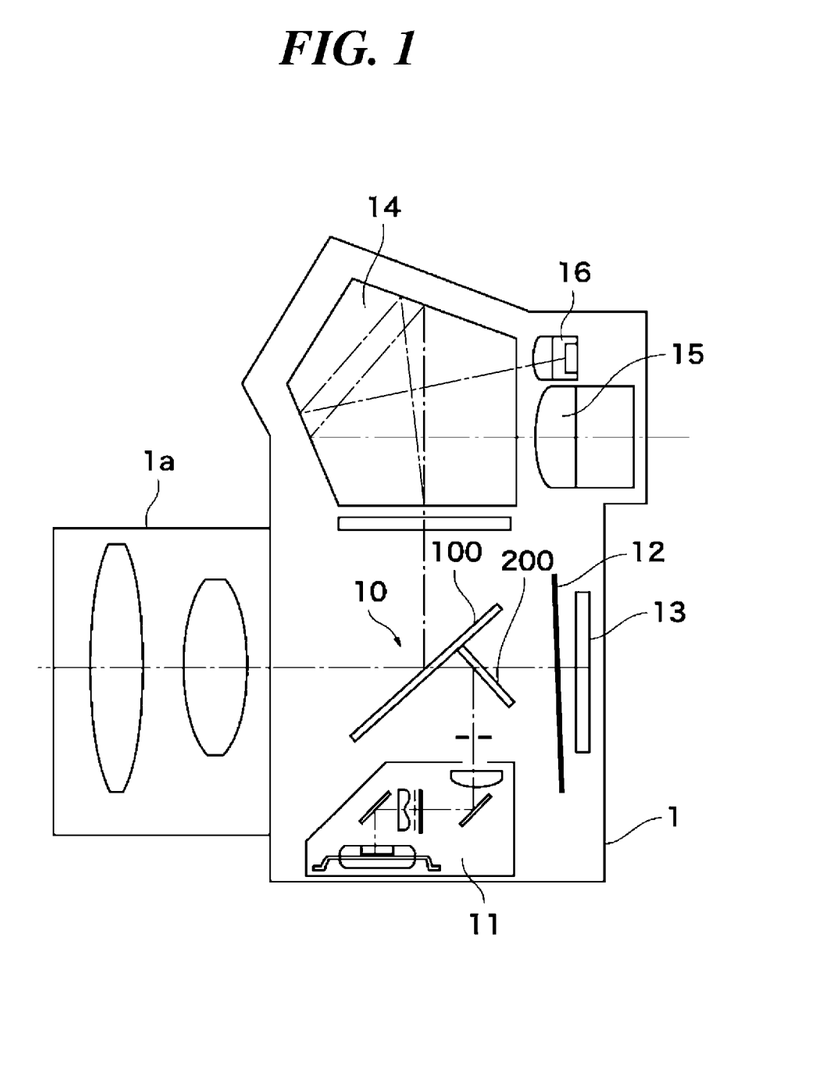
FIG. 1 is a cross-sectional view schematically showing a digital single-lens reflex camera which is an exemplary image pickup apparatus according to an embodiment of the present invention.

FIG. 1 is a cross-sectional view schematically showing a digital single-lens reflex camera which is an exemplary image pickup apparatus according to an embodiment of the present invention.

As shown in FIG. 1, the digital single-lens reflex camera according to the present embodiment has a camera main body 1 on which a lens barrel 1a is removably mounted. A mirror unit 10 is supported on the camera main body 1 rotatably with respect to a mirror box, not shown. The mirror unit 10 has a main mirror 100 comprised of a half mirror, and a sub mirror 200 supported rotatably with respect to the main mirror 100. The mirror unit 10 enters a shooting optical path (mirror down) at the time of observation through a viewfinder, and retracts from the shooting optical path (mirror up) at the time of shooting.

In the mirror down state of the mirror unit 10, a light flux from a subject which has entered the shooting optical path through the lens barrel 1a is divided into a light flux reflected upward by the main mirror 100 and a light flux passing through the main mirror 100. The light flux reflected upward by the main mirror 100 is guided to an eye lens 15 and a photometric measurement unit 16 via a pentagonal Dach prism 14 and others, and the light flux having passed through the main mirror 100 is reflected by the sub mirror 200 and guided to a focus detection unit 11 disposed below. Based on an output signal from the photometric measurement unit 16, exposure control is performed at the time of exposure to light, and based on an output signal from the focus detection unit 11, the operation of the lens barrel 1a is controlled.

On the other hand, in the mirror up state of the mirror unit 10, a light flux from a subject which has entered the shooting optical path through the lens barrel 1a passes through a shutter unit 12 to form an image on an image pickup device 13. The image formed on the image pickup device 13 is displayed on a display unit, not shown, provided on the back of the camera main body 1 and also recorded as image data on a recording medium, not shown.

Figure 2A:
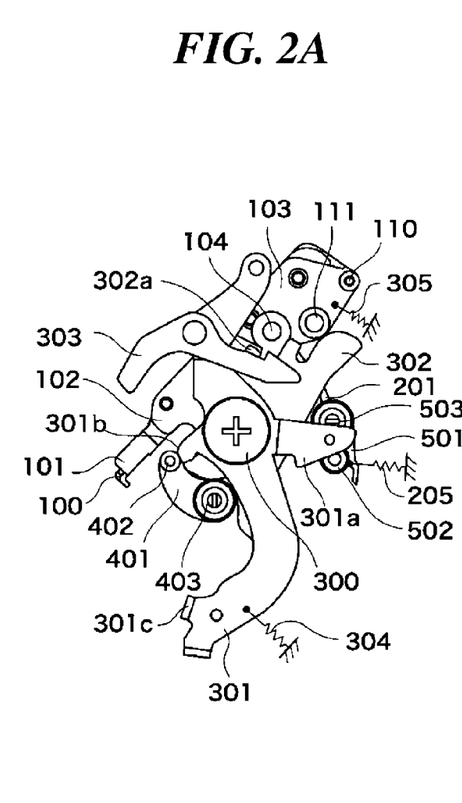
FIG. 2A is a view showing a mirror down state in which a mirror unit has entered a shooting optical path.

Referring next to FIGS. 2A to 8, a detailed description will be given of the mirror unit 10 and a drive unit for the mirror unit 10. FIG. 2A is a view showing the mirror down state in which the mirror unit 10 has entered the shooting optical path, and FIG. 2B is a view showing the mirror up state in which the mirror unit 10 has retracted from the shooting optical path. FIG. 2C is a view showing a state in which the mirror unit 10 has entered the shooting optical path again after shooting in the state shown in FIG. 2B.

Figure 2B:
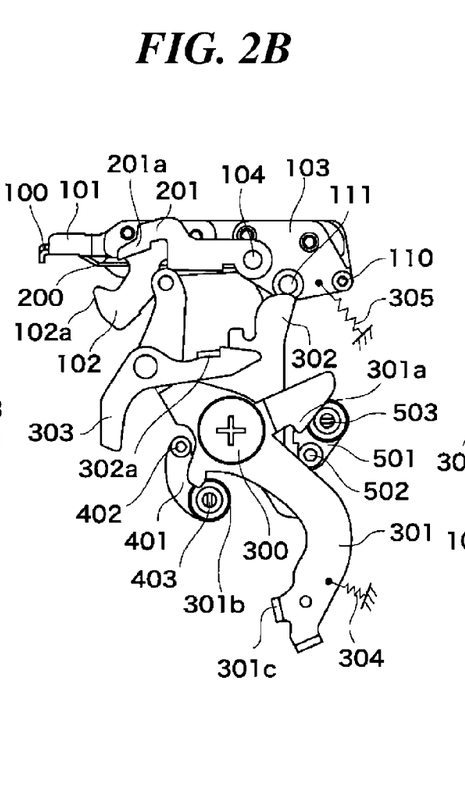
FIG. 2B is a view showing a mirror up state in which the mirror unit has retracted from the shooting optical path.
Figure 2C:
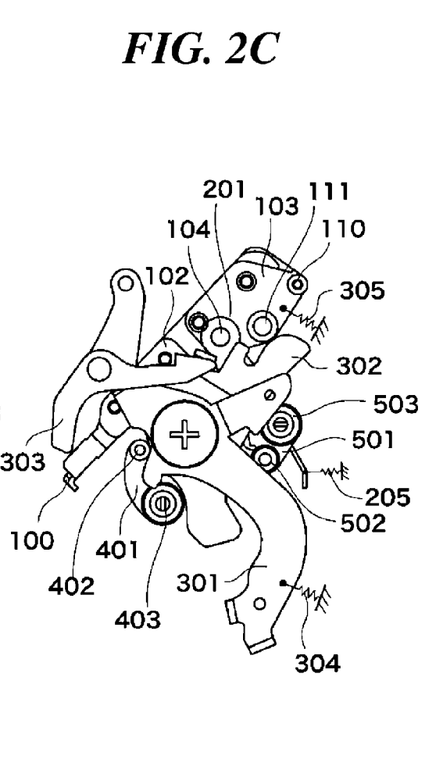
FIG. 2C is a view showing a state in which the mirror unit has entered the shooting optical path again after shooting in the state shown in FIG. 2B.

As shown in FIGS. 2A to 2C, the main mirror 100 is held in a holder 101, to which a bounce lock plate 102 and a holding plate 103 are fixed. The holding plate 103 is provided with a roller 111 and a shaft portion 110, which is the center of rotation of the main mirror 100. The holding plate 103 is urged counterclockwise as viewed in the figure by a spring member 305.

The sub mirror 200 is held in the holder 201, which is rotatable with respect to the main mirror 100 about a shaft portion 104 provided in the holding plate 103. The holder 201 is urged counterclockwise as viewed in the figure by a spring member 205.

A detailed description will now be given of the drive unit for the mirror unit 10. The drive unit has an up-lever 301 that retracts the mirror unit 10 from the shooting optical path, a down-lever 302 that causes the mirror unit 10 to enter the shooting optical path, and adjustment members 403 and 503.

The up-lever 301 and the down-lever 302 are supported by a screw 300 so as to be coaxially rotatable with respect to the mirror box. A hook lever 303 which engages with the down-lever 302 is rotatably supported on the up-lever 301. The up-lever 301 is urged counterclockwise as viewed in the figure by a spring member 304.

A positioning pin 404 (see FIG. 3) that positions the bounce lock plate 102 when the main mirror 100 enters the shooting optical path and stops is fixed to the adjustment member 403. A lock lever 401 is rotatably fitted on the adjustment member 403 coaxially with the positioning pin 404, and a lock pin 402 for locking the bounce lock plate 102 so as to keep the bounce lock plate 102 from bouncing is fixed to the lock lever 401. The lock lever 401 is urged counterclockwise as viewed in the figure by a spring member 406, described later.

A positioning pin 504 (see FIG. 3) that positions the holder 201 when the sub mirror 200 enters the shooting optical path and stops is fixed to the adjustment member 503. A lock lever 501 is rotatably fitted on the adjustment member 503 coaxially with the positioning member 504, and a lock pin 502 for locking the holder 201 so as to keep the holder 201 from bouncing is fixed to the lock lever 501. The lock lever 501 is urged counterclockwise as viewed in the figure by a spring member 506, described later.

Next, a detailed description will be given of an example in which the drive unit drives the mirror unit 10.

In the state shown in FIG. 2A, the up-lever 301 is caused to rotate clockwise against urging force of the spring member 304 by a drive source, not shown, to charge the spring member 304, and a lock lever, not shown, is stopped at a position shown in FIG. 2 in engagement with a bent portion 301c of the up-lever 301. Two cam portions 301a and 301b provided in the up-lever 301 press the lock pins 402 and 502 to release the bounce lock on the main mirror 100 and the sub mirror 200. Here, the up-lever 301 corresponds to an exemplary lever member of the present invention.

In the state shown in FIG. 2B, based on a shooting signal, the bent portion 301c stopped by the lock lever is released, and the up-lever 301 is caused to rotate counterclockwise as viewed in the figure by urging force of the spring member 304. The urging force of the spring member 304 is sufficiently greater than that of the spring member 305, and hence the down-lever 302 engaged with the hook lever 303 also rotates integrally with the up-lever 301 to move the roller 111, causing the mirror unit 10 to retract from the shooting optical path. Moreover, the rotation of the up-lever 301 causes the lock levers 401 and 501 of the main mirror 100 and the sub mirror 200 to rotate clockwise as viewed in the figure, and the main mirror 100 and the sub mirror 200 are put in a state of readiness for bounce lock.

In the state shown in FIG. 2C, based on a shooting completion signal, the hook lever 303 rotates clockwise as viewed in the figure to be brought out of engagement with the down-lever 302. Then, the mirror unit 10 is caused to rotate counterclockwise as viewed in the figure by urging force of the spring member 305, and the roller 111 presses the down-lever 302, causing the down-lever 302 to rotate clockwise as viewed in the figure.

Immediately before the main mirror 100 stops at a predetermined position in the shooting optical path, the bounce lock plate 102 pushes aside the lock pin 402 and is caught by the positioning pin 404, and then the bounce lock plate 102 bounces between the positioning pin 404 and the lock pin 402. This suppresses bounce of the main mirror 100, and after bounce ends, the bounce lock plate 102 comes into contact with and is caught by the positioning pin 404.

Likewise, immediately before the sub mirror 200 stops at a predetermined position in the shooting optical path, the holder 201 pushes aside the lock pin 502 and is caught by the positioning pin 504, and then the holder 201 bounces between the positioning pin 504 and the lock pin 502. This suppresses bounce of the sub mirror 200, and after bounce ends, the holder 201 comes into contact with and is caught by the positioning pin 504.

After that, to prepare for the next shooting, the up-lever 301 is rotated clockwise as viewed in the figure against urging force of the spring member 304. As a result, the hook lever 303 and the down-lever 302 are engaged with each other, and the two cam portions 301a and 301b press the lock pins 402 and 502, so that the bounce lock on the main mirror 100 and the sub mirror 200 is released, and they go into the state shown in FIG. 2A.

Figure 3:
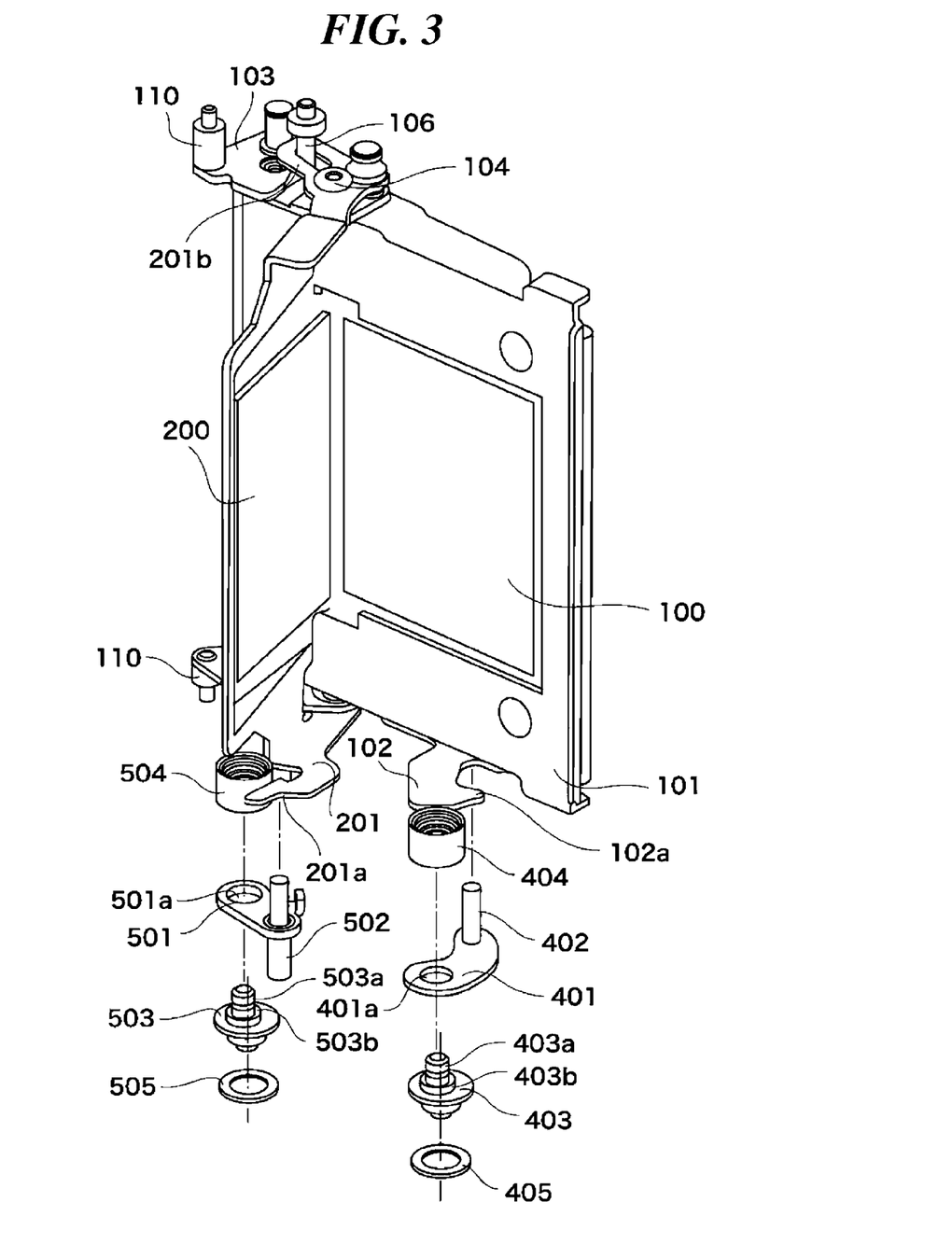
FIG. 3 is an exploded perspective view useful in explaining the relationship between the mirror unit and adjustment members.

FIG. 3 is an exploded perspective view useful in explaining the relationship between the mirror unit 10 and the adjustment members 403 and 503.

Referring to FIG. 3, a shaft portion 403a is eccentrically projected from a rotational center of the adjustment member 403, and a step portion 403b is coaxially provided with the shaft portion 403a at a base end of the shaft potion 403a. A fitting hole 401a of the lock lever 401 is rotatably fitted onto the step portion 403b, and then the positioning pin 404 is coaxially pressed into and fixed in the shaft portion 403a. Accordingly, when the adjustment member 403 is rotated, the positioning pin 404 is eccentrically rotated with respect to the adjustment member 403 and the lock lever 401 eccentrically moves (i.e., moves such as to perform crank motion) with respect to the adjustment member 403. It should be noted that the adjustment member 403 is attached to a ground plate, not shown, via a washer 405 so as to be rotatable using a tool or the like.

When the positioning pin 404 and the bounce lock plate 102 are in engagement with each other, there is a small gap between the lock pin 402 and a hook portion 102a of the bounce lock plate 102. Here, the positioning pin 404 corresponds to an exemplary positioning member of the present invention, and the lock lever 401 corresponds to an exemplary bounce suppressing member of the present invention.

A shaft portion 503a is eccentrically projected from a rotational center of the adjustment member 503 as well, and a step portion 503b is coaxially provided with the shaft portion 503a at a base end of the shaft potion 503a. A fitting hole 501a of the lock lever 501 is rotatably fitted on the step portion 503b, and then the positioning pin 504 is coaxially pressed into and fixed in the shaft portion 503a. Accordingly, when the adjustment member 503 is rotated, the positioning pin 504 is eccentrically rotated with respect to the adjustment member 503 and the lock lever 501 eccentrically moves (i.e., moves such as to perform crank motion) with respect to the adjustment member 503. It should be noted that the adjustment member 503 is attached to a ground plate, not shown, via a washer 505 so as to be rotatable using a tool or the like.

When the positioning pin 504 and the holder 201 are in contact with each other, there is a small gap between the lock pin 502 and a hook portion 201a of the holder 201. Here, the positioning pin 504 corresponds to an exemplary positioning member of the present invention, and the lock lever 501 corresponds to an exemplary bounce suppressing member of the present invention.

It should be noted that when the mirror unit 10 is to retract from the shooting optical path, the main mirror 100 rotates about the shaft portion 110, and the sub mirror 200 rotates about a shaft portion 104 on the holding plate 103 of the main mirror 100. The sub mirror 200 is caused to rotate by a cam portion 201b, which is provided in the holder 201, coming into contact with an inversion shaft 106 fixed to a side of the mirror box, and shields a semi-transmissive area of the main mirror 100.

Figure 4A:
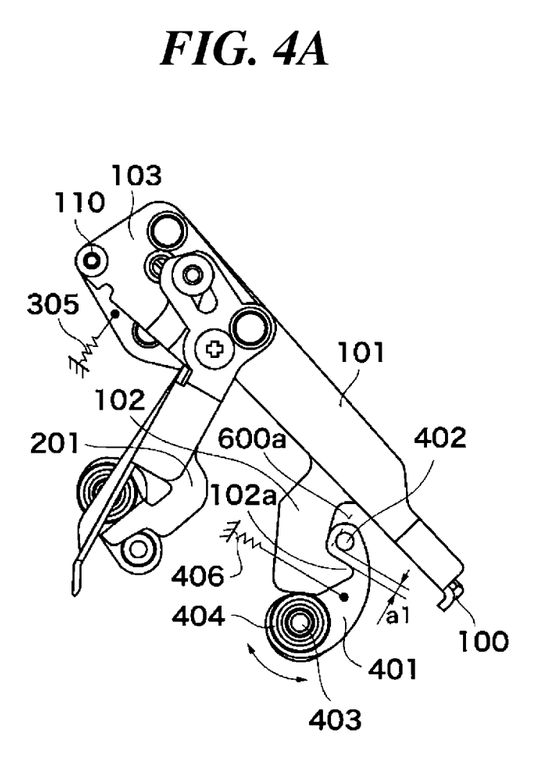
FIG. 4A is a view showing a state of a main mirror before angle adjustment in the mirror down state.
Figure 4B:
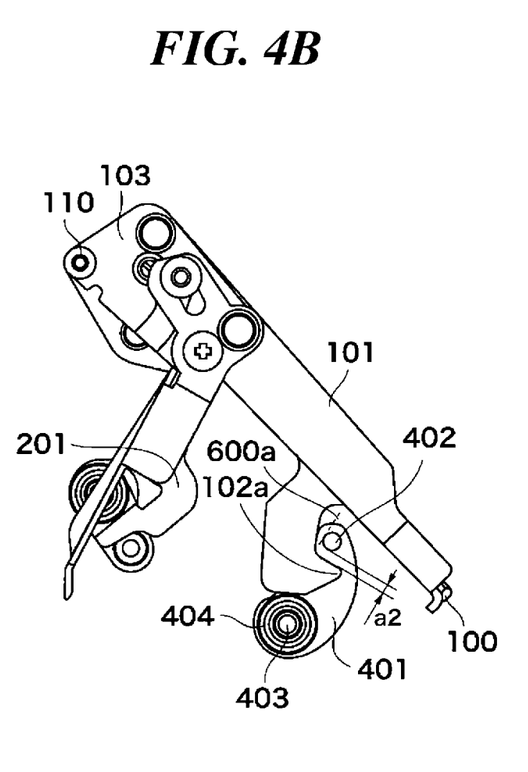
FIG. 4B is a view showing a state of the main mirror after angle adjustment.

Referring next to FIGS. 4A and 4B, a description will be given of how the angle of the main mirror 100 is adjusted.

FIG. 4A is a view showing a state of the main mirror 100 before angle adjustment in the mirror down state. In the state shown in FIG. 4A, the lock pin 402 of the lock lever 401 is brought into contact with a rotation stopper portion 600a provided on a base plate, not shown, by urging force of a spring member 406, and at this time, there is a gap a1 between the lock pin 402 and the hook portion 102a of the bounce lock plate 102.

When the main mirror 100 rotates about the shaft portion 110 to bring the bounce lock plate 102 into contact with the positioning pin 404, the hook portion 102a bounces within the gap a1. In this case, when the gap a1 is large, the time it takes for bounce of the main mirror 100 to end tends to be long, and when the gap a1 is small, the time it takes for bounce of the main mirror 100 to end tends to be short. The amount of the gap a1 is about 0.2 mm to 1.0 mm, but the time it takes for bounce of the main mirror 100 to end varies several ms when the gap a1 varies about 0.1 mm.

Here, when the positioning pin 404 is eccentrically rotated with respect to the adjustment member 403 by rotating the adjustment member 403 using a tool such as a screwdriver, the positioning pin 404 moves from an original position where the positioning pin 404 is positioned before the eccentric rotation thereof, and accordingly, the bounce lock plate 102 which is into contact with the positioning pin 404 also moves following the positioning pin 404. As a result, the main mirror 100 connected to the bounce lock plate 102 rotates about the shaft portion 110.

FIG. 4B is a view showing a state of the main mirror 100 after angle adjustment. In the state shown in FIG. 4B, the angle of the main mirror 100 with respect to a shooting optical axis has been changed, and the angle is adjusted within a range of about ±10 degrees. At this time, because the lock lever 401 is rotatably fitted on the step portion 403b which is eccentric as with the shaft portion 403a, the lock lever 401 also eccentrically moves with respect to the adjustment member 403 to change the position of itself at the same time of the movement of the bounce lock plate 102 accompanying the eccentric rotation of the positioning pin 404. Since the positioning pin 404 as well as the lock lever 401 is attached to the shaft portion 403a of the adjustment member 403, the positioning pin 404 and the lock lever 401 move in the same direction at the same travel distance when the adjustment member 403 is rotated. Moreover, since the bounce lock plate 102 moves following the positioning pin 404, the bounce lock plate 102 moves in the approximately same direction at the approximately same travel distance as the positioning pin 404. Therefore, the lock lever 401 moves in the approximately same direction at the approximately same travel distance as the bounce lock plate 102. As a result, a gap a2 between the lock pin 402 and the hook portion 102a of the bounce lock plate 102 hardly differs from the gap a1 before angle adjustment. In the present embodiment, even when the positioning pin 404 and the bounce lock plate 102 move by rotating the adjustment member 403, a change amount of the gap between the lock pin 402 and the hook portion 102a of the bounce lock plate 102 before and after the movement of the bounce lock plate 102 is substantially constant, or preferably, constant. Accordingly, the time it takes for bounce to end is also nearly unchanged, or preferably, unchanged.

Figure 5A:
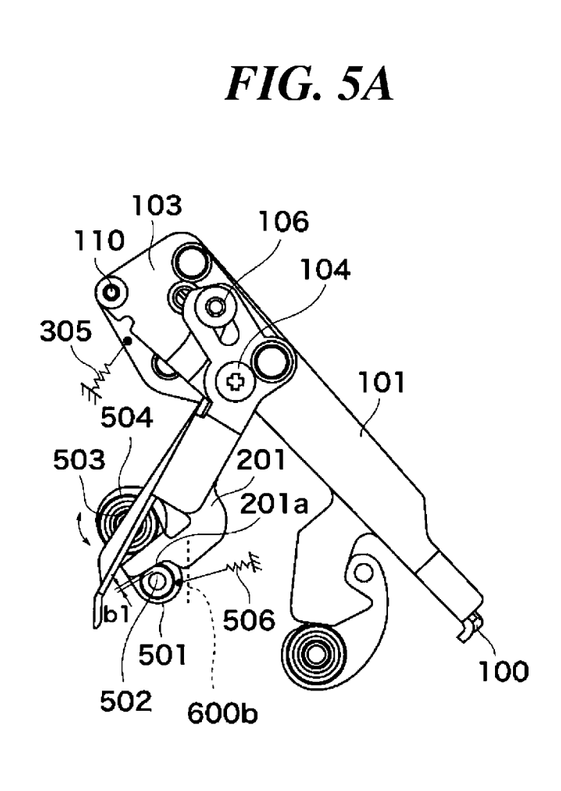
FIG. 5A is a view showing a state of a sub mirror before angle adjustment in the mirror down state.
Figure 5B:
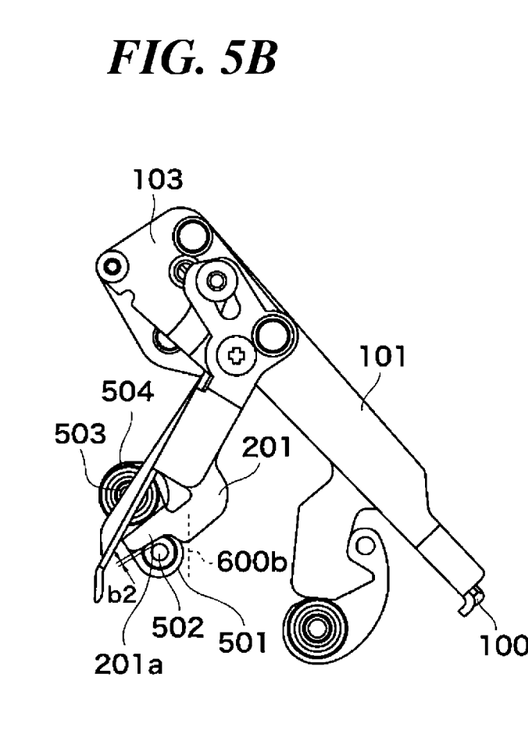
FIG. 5B is a view showing a state of the sub mirror after angle adjustment.
Figure 6:
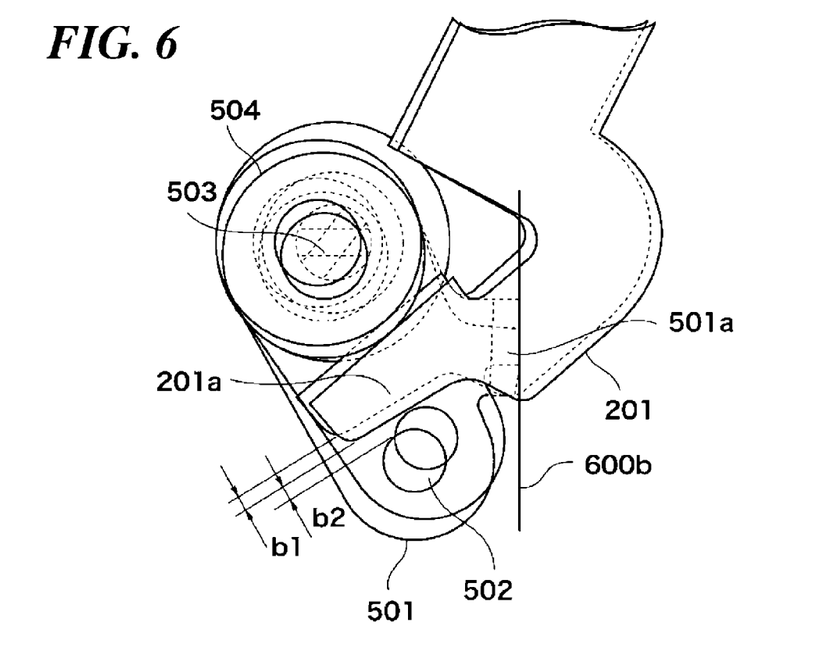

Referring next to FIGS. 5A, 5B, and FIG. 6, a description will be given of how the angle of the sub mirror 200 is adjusted. It should be noted that because the rotational center of the sub mirror 200 is provided on the holder 101 of the main mirror 100, adjusting the angle of the main mirror 100 causes the angle of the sub mirror 200 to change, too. Thus, under normal conditions, the angle of the sub mirror 200 is adjusted after the angle of the main mirror 100 is adjusted.

FIG. 5A is a view showing a state of the sub mirror 200 before angle adjustment in the mirror down state. In the state shown in FIG. 5A, the lock lever 501 is brought into contact with a rotation stopper portion 600b provided on a base plate, not shown, by urging force of a spring member 506, and there is a gap b1 between the lock pin 502 and the hook portion 201a of the holder 201.

When the sub mirror 200 rotates about the shaft portion 104 to bring the holder 201 into contact with the positioning pin 504, the hook portion 201a bounces within the gap b1. In this case, when the gap b1 is large, the time it takes for bounce of the sub mirror 200 to end tends to be long, and when the gap b1 is small, the time it takes for bounce of the sub mirror 200 to end tends to be short. The amount of the gap b1 is about 0.2 mm to 1.0 mm, but the time it takes for bounce of the sub mirror 200 to end varies several ms when the gap b1 varies about 0.1 mm.

Here, when the positioning pin 504 is eccentrically rotated with respect to the adjustment member 503 by rotating the adjustment member 503 using a tool such as a screwdriver, the positioning pin 504 moves from an original position where the positioning pin 504 is positioned before the eccentric rotation thereof, and accordingly, the holder 201 which is into contact with the positioning pin 504 also moves following the positioning pin 504. As a result, the sub mirror 200 connected to the holder 201 rotates about the shaft portion 104.

FIG. 5B is a view showing a state of the sub mirror 200 after angle adjustment. In the state shown in FIG. 5B, the angle of the sub mirror 200 with respect to the shooting optical axis has been changed, and the angle is adjusted within a range of about ±10 degrees. At this time, because the lock lever 501 is rotatably fitted on the step portion 503b which is eccentric as with the shaft portion 503a, the lock lever 501 also eccentrically moves with respect to the adjustment member 503 to change the position of itself at the same time of the movement of the holder 201 accompanying the eccentric rotation of the positioning pin 504. Since the positioning pin 504 as well as the lock lever 501 is attached to the shaft portion 503a of the adjustment member 503, the positioning pin 504 and the lock lever 501 move in the same direction at the same travel distance when the adjustment member 503 is rotated. Moreover, since the holder 201 moves following the positioning pin 504, the holder 201 moves in the approximately same direction by the approximately same travel distance as the positioning pin 504. Therefore, the lock lever 501 moves in the approximately same direction the approximately same travel distance as the holder 201. As a result, a gap b2 between the lock pin 502 and the hook portion 201a hardly differs from the gap b1 before angle adjustment. In the present embodiment, even when the positioning pin 504 and the hook portion 201a of the holder 201 move by rotating the adjustment member 503, a change amount of the gap between the lock pin 502 and the hook portion 201a is substantially constant, or preferably, constant. Accordingly, the time it takes for bounce to end is also nearly unchanged, or preferably unchanged.

FIG. 6 is a view showing in detail the relationship between the gaps b1 and b2 between the lock pin 502 and the hook portion 102a before and after angle adjustment of the sub mirror 200, in which FIG. 5A and FIG. 5B are superimposed.

Figure 7:
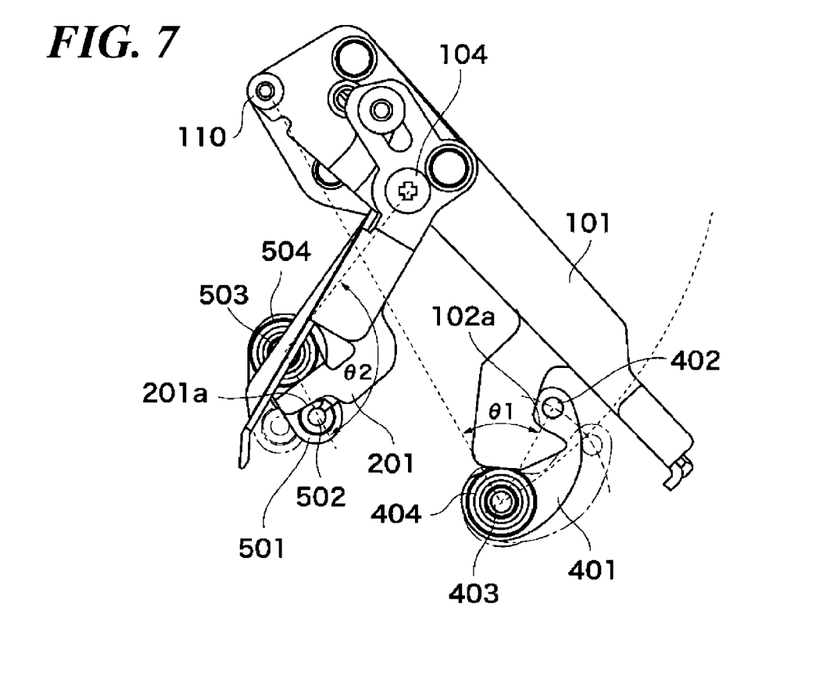
FIG. 7 is a view useful in explaining rotation angle ranges of lock levers in the mirror down state of the mirror unit.

FIG. 7 is a view useful in explaining rotation angle ranges of the lock levers 401 and 501 in the mirror down state of the mirror unit 10.

As shown in FIG. 7, it is preferred that an angle θ1 which a line connecting the rotation center of the main mirror 100 and the center of the positioning pin 404 with each other forms with a line connecting the center of the positioning pin 404 and the center of the lock pin 402 with each other is about a substantially right angle or 45° to 135°. A surface of the hook portion 102a which engages with the lock pin 402 forms a substantially right angle with the line connecting the center of the positioning pin 404 and the center of the lock pin 402 with each other.

Likewise, it is preferred that an angle θ2 which a line connecting the rotation center of the sub mirror 200 and the center of the positioning pin 504 with each other forms with a line connecting the center of the positioning pin 504 and the center of the lock pin 502 with each other is about a substantially right angle or 45° to 135°. A surface of the hook portion 201a which engages with the lock pin 502 forms a substantially right angle with the line connecting the center of the positioning pin 504 and the center of the lock pin 502 with each other.

With the above described shapes, the main mirror 100 and the sub mirror 200 bounce in directions toward the lock pins 402 and 502, and the lock pins 402 and 502 engage with the hook portions 102a and 201a at a substantially right angle. As a result, the main mirror 100 and the sub mirror 200 can be reliably locked to be inhibited from bouncing, and the bounce lock is not released by bounce energy.

In the mirror up state of the mirror unit 10, the lock pins 402 and 502 are pressed by the cam portions 301a and 301b of the up-lever 301 to retract without coming into contact with the hook portions 102a and 201a. Thus, the positioned states of both the main mirror 100 and the sub mirror 200 are unchanged, and in response to a shooting signal, they can rotate immediately when the mirror unit 10 is to be retracted from the shooting optical path.

Figure 8:
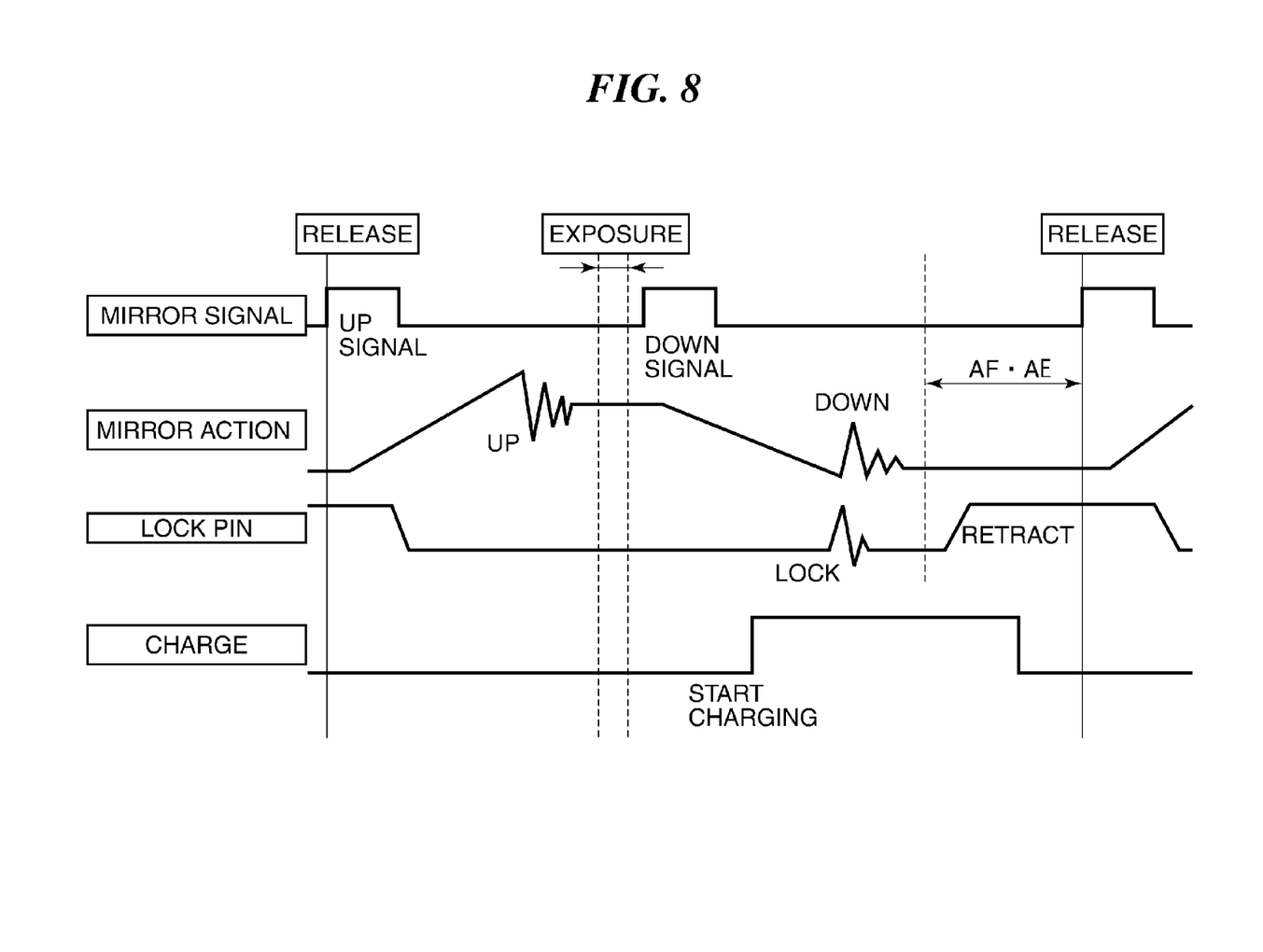
FIG. 8 is a timing chart useful in explaining how the mirror unit moves in accordance with a shooting sequence.

FIG. 8 is a timing chart useful in explaining how the mirror unit 10 moves in accordance with a shooting sequence. It should be noted that the main mirror 100 and the sub mirror 200 move in the same way, and hence a description will now be given of only the main mirror 100.

Referring to FIG. 8, in response to a shooting signal (release signal), a mirror up signal is activated to cause the main mirror 100 to start a retracting (up) operation, and before mirror up is completed, the lock pin 402 is set at a lock position, and after bounce during mirror up ends, exposure is performed.

After exposure is completed, a mirror down signal is activated, and before mirror down is completed, the lock pin 402 works to suppress bounce of the main mirror 100. Then, after bounce of the main mirror 100 ends, focus detection control (AF) and exposure control (AE) for the next shooting are performed. At some point during mirror down, the up-lever 301 rotates in such a direction as to charge the spring member 304, causing the lock pin 402 to retract.

As described above, before and after the angle adjustment of the mirrors 100 and 200, the gaps between the lock pins 402 and 502 and the hook portions 102a and 201a are nearly unchanged. As a result, variations in the time it takes for bounce of the mirrors 100 and 200 to end caused by the angle adjustment of the mirrors 100 and 200 can be reduced.

Moreover, in the present embodiment, because there is no need to adjust the positions of the lock pins 402 and 502 after the angles of the mirrors 100 and 200 are adjusted, assembly of the camera can be made more efficient.

Further, in the present embodiment, because the positioning pins 404 and 504 are disposed coaxially with the rotary shafts of the lock levers 401 and 501, the angle adjustment mechanism and the bounce suppressing mechanism for the mirrors 100 and 200 can be disposed in a relatively small space, and as a result, the camera can be made more compact.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-285876 filed Dec. 22, 2010, which is hereby incorporated by reference herein in its entirety.

What is claimed is:

1. An image pickup apparatus comprising:
a mirror unit configured to enter a shooting optical path at a time of observation through a viewfinder, and retract from the shooting optical path at a time of shooting;
a positioning member with which the mirror unit having entered the shooting optical path comes into contact so as to be positioned in the shooting optical path;
a bounce suppressing member comprising a lock pin configured to suppress bounce of the mirror unit that has come into contact with the positioning member; and
an adjustment member comprising a first shaft portion to which the positioning member is fixed and a second shaft portion on which the bounce suppressing member is rotatably fitted,
wherein the second shaft portion is coaxially provided with the first shaft portion, and the first shaft portion and the second shaft portion are eccentric from a rotational center of the adjustment member, and
wherein when said adjustment member is rotated, said positioning member and said bounce suppressing member move in the same direction at the same travel distance.

2. An image pickup apparatus according to claim 1, further comprising a spring member configured to urge said bounce suppressing member in a direction opposite to a direction in which said mirror unit enters the shooting optical path.

3. An image pickup apparatus according to claim 2, further comprising a lever member configured to, when said mirror unit is to retract from the shooting optical path, rotate said bounce suppressing member in such a direction that said lock pin retracts from such a position as to suppress bounce of said mirror unit.

4. An image pickup apparatus according to claim 3, wherein the lever member is configured to rotate said mirror unit in such a direction that said mirror unit retracts from the shooting optical path.

* * * * *